US007627652B1

(12) United States Patent
Commons et al.

(10) Patent No.: US 7,627,652 B1
(45) Date of Patent: Dec. 1, 2009

(54) ONLINE SHARED DATA ENVIRONMENT

(75) Inventors: Peter V. Commons, Issaquah, WA (US); Jeffrey M. Scherpelz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 606 days.

(21) Appl. No.: 11/275,852

(22) Filed: Jan. 31, 2006

(51) Int. Cl.
*G06F 15/16* (2006.01)
(52) U.S. Cl. .................. 709/219; 709/213; 709/225; 709/246
(58) Field of Classification Search .............. 709/213
See application file for complete search history.

(56) References Cited

U.S. PATENT DOCUMENTS

| | | | | |
|---|---|---|---|---|
| 5,918,229 | A * | 6/1999 | Davis et al. ............ | 707/10 |
| 5,930,801 | A * | 7/1999 | Falkenhainer et al. ... | 707/103 R |
| 6,266,716 | B1 * | 7/2001 | Wilson et al. ........... | 710/33 |
| 6,449,627 | B1 * | 9/2002 | Baer et al. .............. | 715/206 |
| 6,985,927 | B2 * | 1/2006 | O'Brien et al. .......... | 709/213 |
| 7,124,305 | B2 * | 10/2006 | Margolus et al. ........ | 713/193 |
| 7,171,472 | B2 * | 1/2007 | O'Brien et al. .......... | 709/226 |
| 2003/0046548 | A1 * | 3/2003 | Brown et al. ............ | 713/182 |
| 2006/0031923 | A1 * | 2/2006 | Kanai ...................... | 726/1 |

* cited by examiner

*Primary Examiner*—Firmin Backer
*Assistant Examiner*—Natisha Cox
(74) *Attorney, Agent, or Firm*—Lee & Hayes, PLLC (57) ABSTRACT

An online data storage arrangement allows online users to share data with other users having online connectivity. User digital lockers may include a number user created content objects and view objects. A content object is a link to one or more data objects that a user may wish to share with others. Such a content object may specify a plurality of permissions that manage what a user can or cannot do with the content object. A content object's permissions may dictate use of the content object when it is shared with other users. Or, a content object's permissions may dictate use of a copied version of the content object. A view object is a medium that may be used to share content objects. A user may create a view object that references or includes one or more content objects. Users having authorized access to the view object may use the referenced/included content objects.

30 Claims, 10 Drawing Sheets

ONLINE SHARED DATA ENVIRONMENT

BACKGROUND

The Internet has revolutionized the way we communicate with each other. This is true at work and in our homes. The Internet allows us to use electronic mail (email) to convey messages to contemporaries and loved ones across the globe. More recently, users of the Internet have started employing Weblogs, also known as blogs, to communicate with others. A blog may be public Website where users post informal journals of their thoughts, comments, and philosophies, updated frequently and normally reflecting the views of the blog's creator.

Users have also found that the Internet can be used to exchange digital information. This digital information may be in the form of word-processing documents, pictures, and music files. For the most part, any computer generated file may be communicated over the Internet. Applications such as email, file transfer, remote logon and the like have greatly simplified the exchange of digital information using the Internet. These applications simplify point-to-point delivery of digital information. However, such applications do not provide robust file transfer services or storage of files and data in a convenient location on the Internet.

A number of Internet file storage services are in existence today. Generally, these services offer online storage of data. Businesses may choose to store some of their more important files online for security reasons, or as backup files should something happen to their brick and mortar locality. Individual users may store some or all of their files online to increase file accessibility.

Conventional Internet file storage services operate much like storage devices implemented in computer devices. In particular, for obvious security reasons, a user must generally possess proper logon credentials to gain access to an Internet file storage location. To transfer files stored in the Internet file storage location necessitates the use of an email application or other file transfer application. Therefore, similar to applications resident on a computer device and usable to transfer files, Internet file storage services do not generally offer robust file sharing facilities.

SUMMARY

A robust online data storage arrangement allows users to share data with other users connected to a Website. User digital lockers are provided to individual authorized users of the Website. These user digital lockers may include a number of content objects and view objects. These content objects may be created by users, entities, such as online retailers and other e-commerce merchants, or the like. A content object is linked to one or more data that a user may wish to share with others. Such a content object may specify a plurality of permissions that manage what a user can or cannot do with the content object. In one implementation, a content object's permissions dictate use of the content object when it is shared with other users. In another implementation, a content object's permissions dictate use of a copied version of the content object. A view object is a medium that may be used to share content objects. A user may create a view object that references or includes one or more content objects. Views can reference a specific list of objects or a dynamic list of objects (defined by a query). The user may also specify users that may gain access to the view object and the content objects referenced thereby. Users having access to such a view object may access the object through their own user digital locker and perform the functions enabled by the combination of the content object's share permissions and the view's enabling permissions. The use of content objects and view objects enable users to share data in a substantially safe manner.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to an online data storage environment. The online data storage environment may be hosted by a Website that is interfaced with a digital locker server. The digital locker server communicates with a server farm that houses data. With user devices, users access the Website to establish or create accounts that are linked to digital lockers served by the digital locker server. The digital lockers enable users to share and exchange data in an effective and safe manner.

A digital locker may be used to store links to data. These links are called content objects. The content objects may be in any user selectable format, such as icons and descriptive text. Each content object has a link to data, such as an electronic file or a plurality of electronic files. However, the content object is independent of the data to which it is linked. In one implementation, the data may be stored on the server farm that houses data. In the following, data linked to content objects may be considered solitary data or a plurality of data.

A digital locker may have many content objects stored therein. A user, as well as an originator of a content object, may dictate the use of the content object and therefore the linked data. To that end, each content object has a number of permissions groups that include permissions that dictate use of the content object. One permissions group is intrinsic to the content object. The creator of the content object generally defines the permissions of the intrinsic permissions group. In one implementation, once a content object's intrinsic permissions group is defined by the creator, the group may not be modified. Another permissions group is called the share permissions group. The permissions of the share permissions group define what a user with shared access to a content object may do with the object. In one implementation, similar to the intrinsic permissions group, the share permissions group is defined by the creator of the content object and may not be modified thereafter. Another permissions group is called the copy permissions group. The permissions of the copy permissions group define what a user with a copy of a content object may do with the copied object. Again, in one implementation, the copy permissions group is defined by the creator of the content object and may not be modified thereafter.

A digital locker may also include a number of view objects. A view object may be created by a user as a vehicle to share content objects with one or more other users. A view object has its own permissions group. This group of permissions is called the enabling permissions group. The modifiable permissions of the enabling permissions group define what users can or cannot do with content objects identified in a view object.

The online data storage environment may be implemented in a number of ways. Example implementations are provided below with reference to FIGS. 1-10, as described below.

System Architecture

Figure 1:
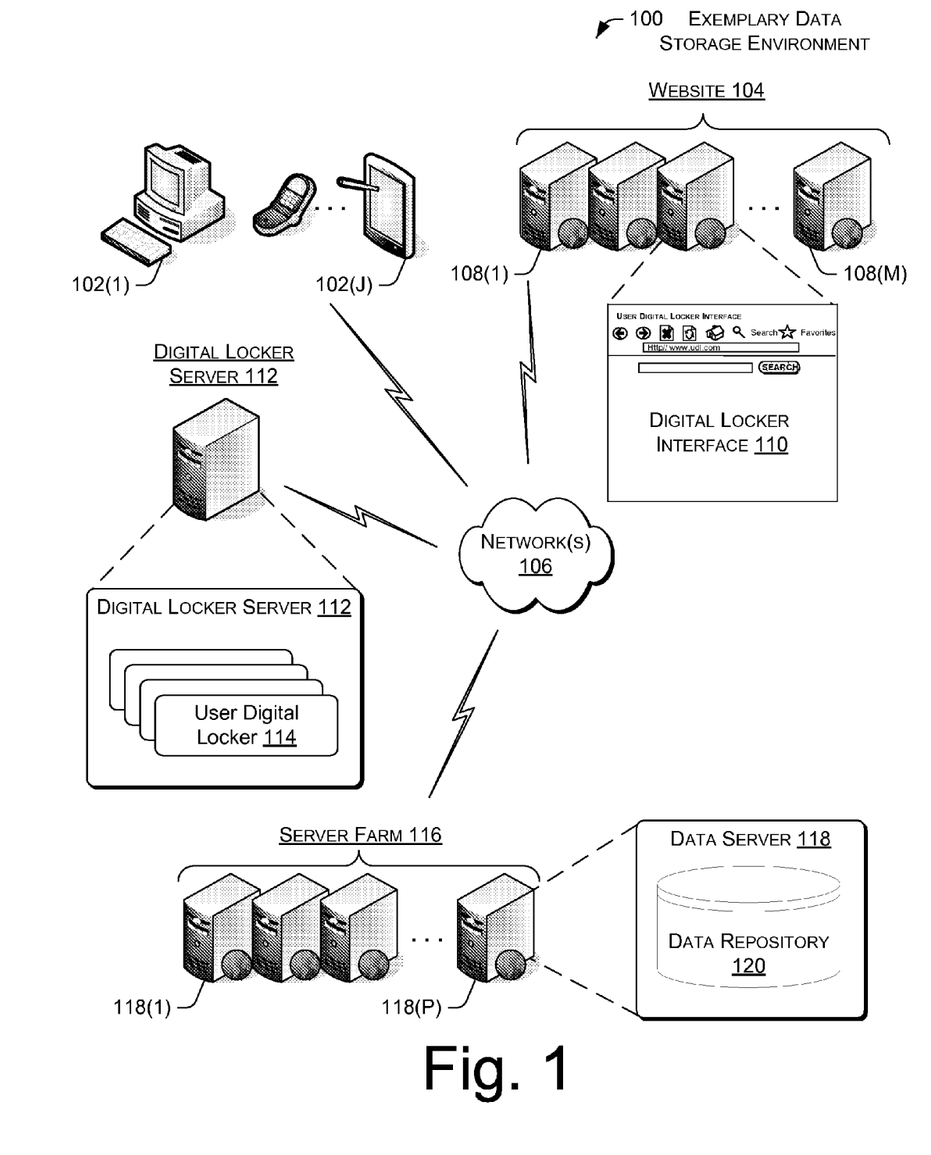
FIG. 1 illustrates an example data storage environment in which users may store data and share the stored data with others that have access to the environment. The environment includes one or more user devices coupled with a Website via a network. The Website is coupled to a digital locker server via the network, and the digital locker server is in communication with a server farm via the network.

FIG. 1 illustrates an example environment 100 in which users may store data and share their stored data with others. In the environment 100, many user computing devices 102 (1), . . . , 102(J) can access a Website 104 via a network 106. The network 106 is representative of many different types of networks, such as cable networks, the Internet, and wireless networks.

The Website 104 is hosted on one or more servers 108(1), . . . , 108(M), perhaps arranged as a server farm. Other server architectures may also be used to host the Website 104. The Website 104 is capable of handling requests from many users and serving, in response, various Webpages and/or user interfaces that can be rendered on the user computing devices 102. The Website 104 is representative of essentially any site supporting user interaction, including online retailers and other e-commerce merchants, informational sites, search engine sites, news and entertainment sites, and so forth.

The user computing devices 102 (also referred to as "client computers" or simply "clients") are illustrated as personal computers, wireless phones and tablet computers, but may also be implemented as other devices, such as set-top boxes, game consoles, laptop computers, portable digital assistants (PDA), and so forth. Each user computing device 102 is equipped with one or more processors and memory to store applications and data. A browser application may be stored in the memory and executes on a processor to provide access to the Website 104. The browser renders Webpages served by the Website 104 on an associated display. One such Webpage is a digital locker interface 110.

When users direct clients 102 to request one or more Webpages and/or interfaces from the Website 104, the computing devices 102 send uniform resource locator (URL) requests to the servers 108. Upon receiving a URL request, the servers 108 return a Webpage back to the requesting client computer. The user computing device invokes a browser to render the Webpage, allowing the user to interact with the Webpage. In one exemplary implementation, a Webpage that includes the digital locker interface 110 is returned to a requesting client device.

The Website 104 is configured to provide users with online data storage. The Website 104 is further configured to allow users to share data stored online with other users interfaced with the Website 104. To that end, the Website 104 makes use of a digital locker server 112. The digital locker server 112 houses one or more user digital lockers 114 that are connected to users' accounts. These digital lockers 114 may contain a number of content and view objects. Users may add, modify and make use of content and view objects stored in their digital locker 114 by way of the digital locker interface 110. In an alternative implementation, the digital locker server 112 is part of an infrastructure associated with the Website 104.

Content objects are generally linked to data. This data is normally in the form of electronic files. The electronic files may be in many different formats. Example electronic file formats include word-processing files, and audio and video media files. A content object may be linked to a plurality of electronic files. In one implementation, one or more files include private data and one or more files include public data. Differences between private and public data are described hereinafter.

In the exemplary data storage environment 100 illustrated in FIG. 1, the Website 104 employs a server farm 116 to house data that is associated with content objects. The server farm 116 comprises one or more data servers 118(1), . . . , 118(P). The data servers 118 may operate individually or collectively to serve data stored in a data repository 120. When a user requests data associated with a content object, the digital locker server 112 interfaces with the data servers 118 and requests the data. The data servers 118 serve the requested data from the data repository 120. Content objects are discussed in greater detail below. In an alternative implementation, the server farm 116 is part of an infrastructure associated with the Website 104.

View objects enable users to easily share their content objects. In general, a view object includes references to one or more content objects that are optionally shared with users. When creating a view object, a user identifies one or more content objects for inclusion in the view object. The user also identifies one or more other users that will have access to the view object. In one implementation, each identified user is able to access the view object and the content objects referenced thereby directly from a digital locker associated with the view object's creator. View objects are discussed in greater detail below.

Digital Locker Implementation

Figure 2:
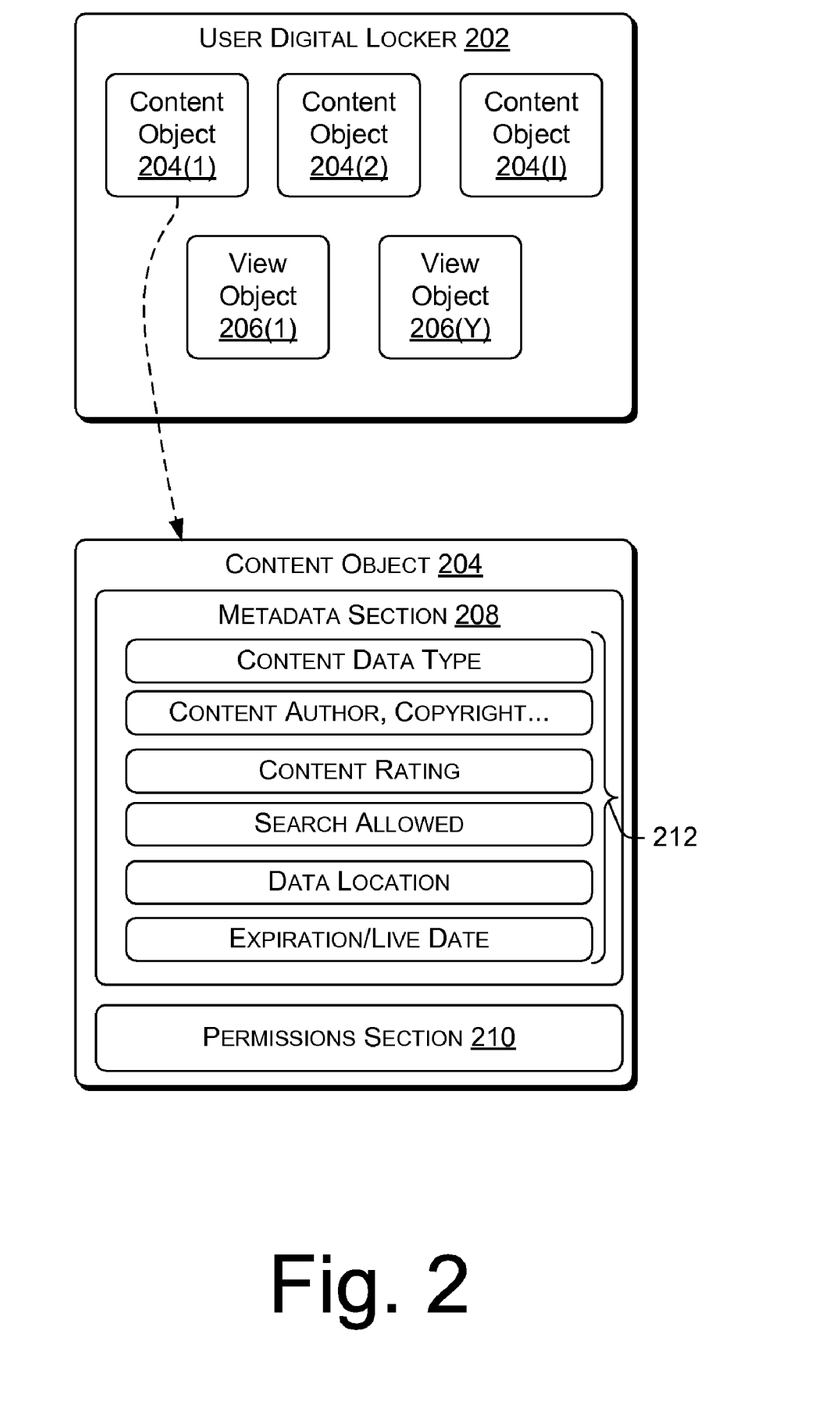
FIG. 2 illustrates an example implementation of a user digital locker that is implemented on a digital locker server. The user digital locker includes a number of content and view objects.

FIG. 2 illustrates an example implementation of a user digital locker 202 that may be implemented on the digital locker server 112. The server 112 has processing capabilities and memory suitable to store and execute computer-executable instructions. In this example, the user digital locker 202 is implemented as software or computer-executable instructions stored in a memory of the server 112 and executed by one or more processors of the server 112. The memory may be implemented as non-removable persistent storage of the servers, although other suitable computer storage media may also be used to store the user digital locker 202. An example of a computer system is provided below with reference to FIG. 7.

The user digital locker 202 includes a plurality of content objects 204(1), . . . , 204(I). The digital locker also has a plurality of view objects 206(1), . . . , 206(Y). The content objects 204 are generally links to one or more electronic files that are stored on a data server 118 implemented by the server farm 116. These one or more electronic files may be either private data or public data. Access to the private and public data is dictated by permissions associated with a related content object. In one implementation, access to the private and public data is controlled by one or more of the intrinsic, share, copy and public permissions groups. The content objects 204 will be described in detail first, followed by a detailed description of the view objects 206.

The user digital locker 202 may belong to a user having authorized access to the Website 104. A user may obtain authorized access to the Website 104 by successfully completing a user-logon process employed by the Website 104. Website 104 may automatically create a user digital locker when a user first gains access to the Website 104. Alternatively, the Website 104 may allow authorized users to create their own user digital lockers.

Each of the content objects 204 includes a metadata section 208 and a permissions section 210. The metadata section 208 has a number of metadata entries 212 that describe certain attributes of a content object. The metadata entries 212 shown in FIG. 2 may be greater than or less than the number shown. The exemplary content object 204 includes six metadata entries 212 in the metadata section 208. A Content Data Type metadata describes the type of data that the content object 204 is linked to. The Content Data Type metadata may specify if the linked data is word-processing data, image data, video data, or other data. To achieve this, the Content Data Type metadata may specify a file name extension. Some common filename extension formats include .doc, .jpeg, .avi, and .wav. An operating system or user device processing data linked to the content object 204 may use the Content Data Type metadata to select an appropriate application to execute the linked data.

Content Author, copyright, etc. metadata describes an author or creator of the data the content object 204 is linked to. For example, if the linked data is a digital image, the Content Author, copyright, etc. metadata may include the name of the individual or entity that created the digital image. The Content Rating metadata may be used to rate the inherent properties of data linked to the content object 204. This metadata may be similar to the rating scheme used by the film industry (i.e., G, PG, PG13, and R). Again, an operating system or user device processing data linked to the content object 204 may use the Content Rating metadata to determine if the data may be processed and consumed by a user.

The Search Allowed metadata controls whether or not the content object 204 is indexed for searching. If the Search Allowed metadata is enabled, the metadata of the metadata section 208 are indexed and available through queries. Otherwise, if the Search Allowed metadata is disabled, the content object 204 is only available to a user account the content object 204 is connected with. Data Location metadata specifies a location of data that is linked to the content object 204. In one implementation, the Data Location metadata specifies a filename and/or drive path associated with the data repository 120. The Data Location metadata may alternatively specify a uniform resource locator (URL) where the data linked to the content object 204 is located. When a user invokes the content object 204, the Data Location metadata is used to retrieve appropriate data linked to the content object 204.

The metadata section 208 may include Expiration/Live Date metadata. This metadata controls whether or not the content object 204 is available during a limited time period. In one implementation, the Expiration/Live Date metadata specifies a date that the content object 204 will be automatically deleted by the Website 104. In another implementation, the Expiration/Live Date metadata specifies a date that the content object 204 will be accessible. In yet another implementation, the Expiration/Live Date metadata specifies two separate dates; one date specifies when the content object 204 will be automatically deleted by the Website 104 and the other date specifies when the content object 204 will be accessible.

Figure 3:
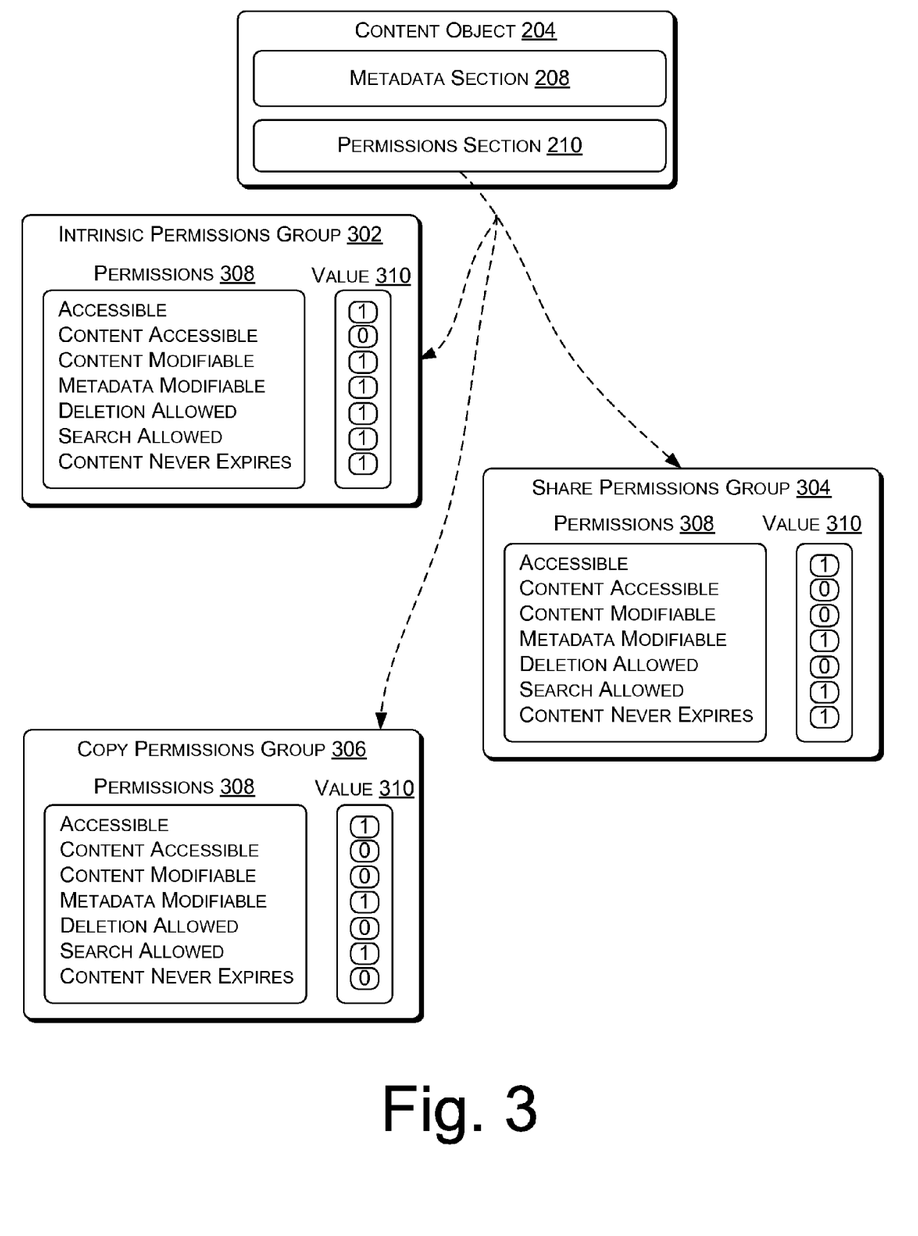
FIG. 3 illustrates an example implementation of a permissions section. The permissions section may be employed by a content object. The section specifies how the content object may be used, shared and/or copied.

FIG. 3 an example implementation of the permissions section 210 employed by the content object 204. In general, the permissions section 210 defines rules that control what a user can and cannot do with the content object 204. The rules of the permissions section 210 may apply to an owner of the content object 204, one or more users that have been granted shared access to the content object 204, and one or more users that have been given a copy of the content object 204.

The permissions section 210 includes three distinct permissions groups: an intrinsic permissions group 302, a share permissions group 304 and a copy permission group 306. The intrinsic permissions group 302 includes permissions that are imposed when a content object is created. Content objects may be created by individual users. A user may be a person or an entity, such as a company or other organization. In general, just the creator of a given content object may modify the permissions of the intrinsic permissions group 302 and generally only when the content object is created. In one implementation, the intrinsic permissions group 302 is locked after it is first defined. In another implementation, only the original creator of a content object may modify the intrinsic permissions group 302.

The share permissions group 304 defines what other uses can or cannot do with a content object when it is shared via a view object or publicly. In general, the share permissions group 304 defines what users, where the users are other than an owner or an originator of a content object, can or cannot do with the content object. The copy permissions group 306 defines what other users can or cannot do with a copy of a content object. Restrictions imposed by the groups 302-306 are further described with the following example.

Suppose an e-commerce entity creates a content object that is linked to one or more music files. When the content object is created, the e-commerce entity may want to define what original recipients of the content object can or cannot do with the object. The intrinsic permissions group 302 is used for this purpose. Similarly, the e-commerce entity may also want to allow the original recipients of the content object the ability to share the content object with other users. However, the e-commerce entity may want to limit what those other users can or cannot do with the content object when it is shared. The share permissions group 304 is used for this purpose. Finally, the copy permissions group 306 is used by the e-commerce entity to limit what users can or cannot do with a copied version of the content object. Defining how a content object may be shared/copied necessarily defines how data linked to the content object may be shared/copied.

Each permissions group 302-306 has a permissions section 308 and a value section 310. In the following, the permissions section 308 and the value section 310 associated with the intrinsic permissions group 302 will be described in detail. The permissions sections 308 and value sections 310 of the groups 304 and 306 are functionally similar to that of the sections 308 and 310 associated with the intrinsic permissions group 302. Therefore, for brevity, section 308 and 310 associated with groups 304 and 306 will not be discussed in detail.

The intrinsic permissions group 308 has a plurality of permissions that may be enabled or disabled. The value section 310 is used to enable or disable permissions of the permissions group 308. A "1" in the value section 310 indicates a permission is enabled and a "0" indicates a permission is disabled.

The Accessible permission controls if a content object is viewable. If the Accessible permission is enabled, then a content object is at least viewable. Here, viewable means that a content object may be seen in a user digital locker. If the Accessible permission is disabled, then a content object is not viewable. The content object may be in one or more user digital lockers, but if the Accessible permission is disabled the content object is hidden. The Accessible permission also controls access to any public data that may be associated with a content object. If the Accessible permission is enabled, at least any public data that is associated with a content object is accessible. However, enabling the Accessible permission does not enable access to any private data associated with a content object. The Content Accessible permission enables access to private data.

The Content Accessible permission controls access to private data associated with a content object. If the permission is enabled, the associated private data is read accessible. If the permission is disabled, then read access to the associated private data is not permitted. The Content Modifiable permission controls write access to the associated private data. Write access to the associated private data is permitted if the Content Modifiable permission is enabled.

The Metadata Modifiable permission controls whether a user can modify some or all of the metadata associated with a content object. If enabled, metadata is modifiable. The Deletion Allowed permission controls whether or not the content object may be deleted. If enabled, the Deletion Allowed permission allows an owner of the content object to delete the object.

The Search Allowed permission controls whether or not a content object is indexed for searching. If the permission is enabled, the content object may be indexed and discovered by way of a relevant search query. If the Search Allowed permission is disabled, the content object is not indexed and thus may not be found by way of search query. However, search would be possible for the owner and/or creator of a given content object.

The Content Never Expires permission controls whether or not a content object is available over a limited time period. If the permission is enabled, the content object does not expire. If the permission is disabled, metadata may be used to specify when the content object is available. For example, metadata associated with a content object may be used to identify a date and time that the content object will be available to users, and a date and time that the content object will become inaccessible. The content object may be deleted from one or more user digital lockers at a date and time the object becomes inaccessible.

The various permissions described in the foregoing give a creator/owner of a content object a great deal of sharing and/or copy distribution flexibility. For example, an owner of a content object may choose to share the object with another user for a limited time period. This is achieved using the Content Never Expires permission of the share permissions group 304. Or, a creator of a content object may want to prevent an owner/user from sharing a content object. The Accessible permission of the group 304 may be used to prevent sharing. Many other content object sharing and copying options are available using the share permissions group 304 and the copy permissions group 306, respectively.

Although not shown in the figures, content objects (e.g., content object 204) may also include a public permissions group as well. The public permissions group defines rules that control what general users can and cannot do with the content object 204, and can be modified/established by an owner of the content object 204. For example, the owner of the content object 204 may use the public permission group to control access of the content object 204 associated with their digital locker. However, the public permissions cannot exceed the permissions defined by the permissions groups 302-306.

Figure 4:
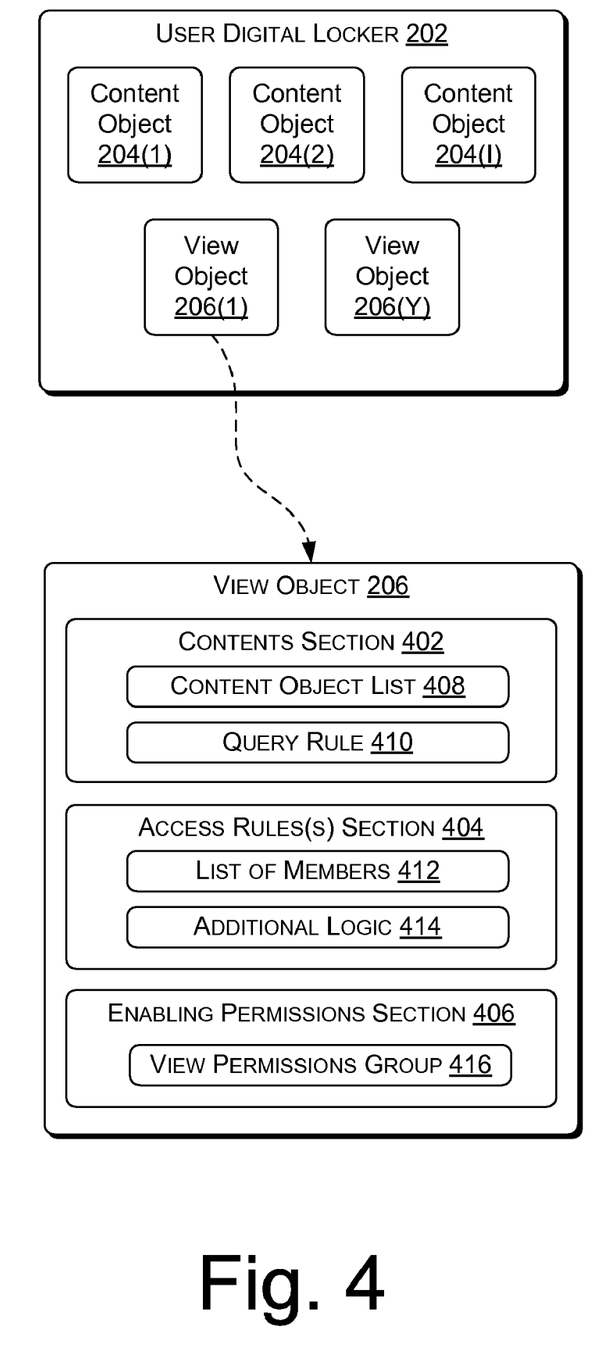
FIG. 4 illustrates an example implementation of a view object contained in a user digital locker.

FIG. 4 illustrates an example implementation of the user digital locker 202 that may be implemented on the digital locker server 112. With reference to the figure, specifics related to the view object 206 will be described. Recall, a view object may be created to share one or more content objects with other users. According to one implementation, the users, including the user sharing the content objects, are members of the Website 104. The members of the Website 104 have usernames, email addresses, or other identifying credentials. The members' identifying credentials may be used to identify those users that are given access to a view object.

The view object 206 has a contents section 402, an access rule(s) section 404 and an enabling permissions section 406. The content section 402 includes a content object list section 408 and a query rule section 410, and is used to identify content objects that are associated with the view object 206. The content object list section 408 is capable of receiving a number of content object names for inclusion in the view object 206. Query rule section 410 may include a query statement that is used to dynamically identify content objects that are associated with the view object 206. A query statement may include a word or a phrase that is compared against a plurality of content objects in a user digital locker. Those content objects that include the word or phase in its name and/or metadata are associated with the view object 206.

The access rule(s) section 404 has a list of members section 412 and an additional logic section 414. Generally the access rule(s) section 404 is used to define which members/users have access to the view object 206 and when those members/users have the access. The list of members section 412 may be augmented with one or more usernames, email addresses, or the like. Any user credential convention may be used in conjunction with the list of members section 412. The additional logic section 414 may be used to specify when the view object 206 is available to the users listed in the list of members section 412. For example, the additional logic section 414 may specify a date the view object 206 is available and a date the object 206 is no longer accessible.

The enabling permissions section 406 includes a view permissions group 416 that is used to define permissions associated with the view object 206. The permissions of the view permissions group 416 are similar to the permissions discussed in connection with the permission groups 302-306. However, instead of defining permissions for just one content object, the permissions of the view permissions group 416 apply to all of the content objects identified by the view object 206.

Figure 5:
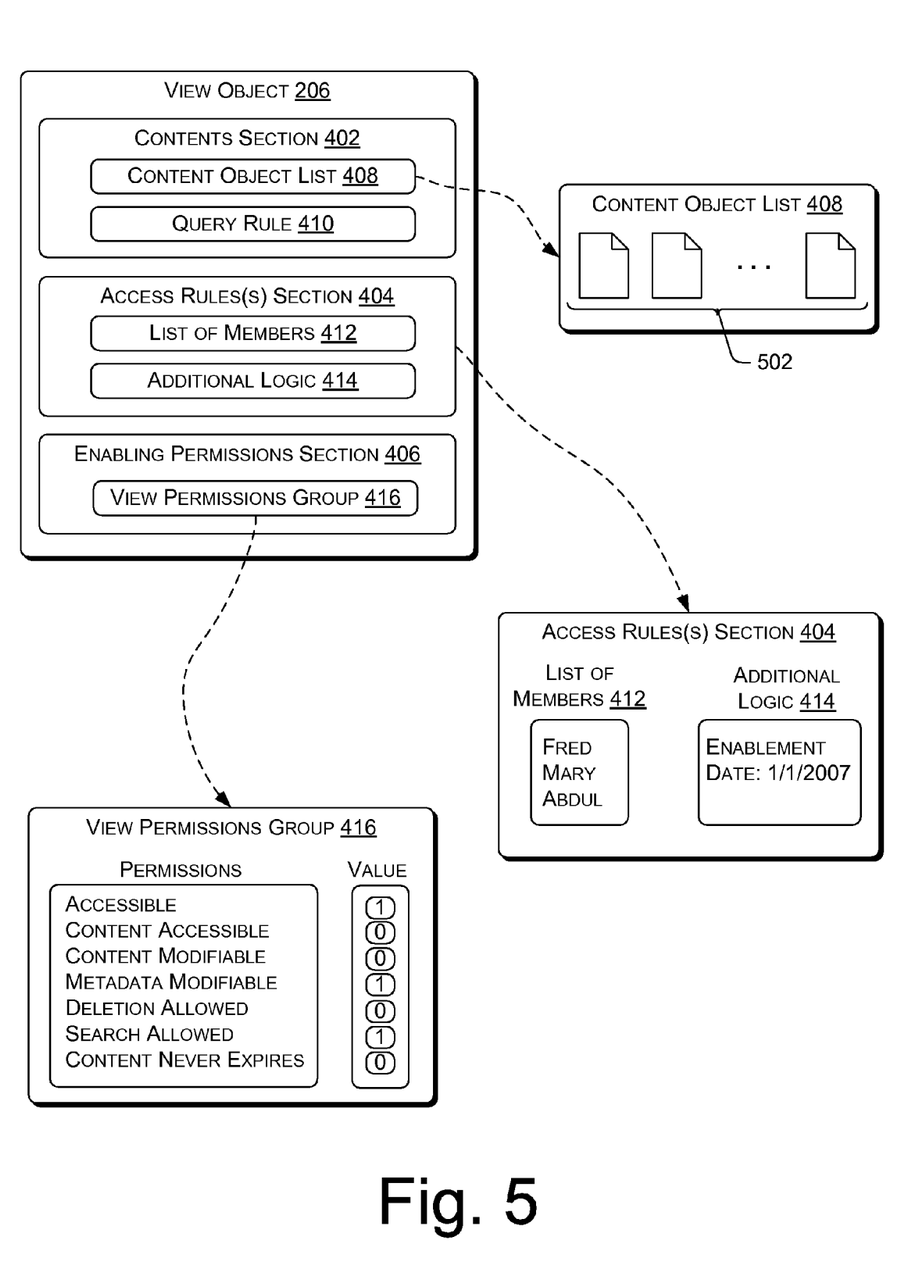
FIG. 5 illustrates additional details of the view object first illustrated in FIG. 4.

FIG. 5 illustrates the view object 206 of FIG. 4 in additional detail. The view object 206 includes a number of content objects 502 in the content object list 408. A user creating and/or modifying the view object 206 may add the content objects 502 to the content object list 408 using the digital locker interface 110 illustrated in FIG. 1, or any other suitable interface implemented by the Website 104. Such an interface may be served to the user devices 102 in a format that may be rendered thereby.

The access rule(s) section 404, in particular the list of members section 412, includes three users (Fred, Mary and Abdul) that have access to the content objects 502. The three users may access the user digital locker 202 to interface with the view object 206. The additional logic section 414 specifies an enablement date of Jan. 1, 2007. This is the date that the view object 206 will be activated. The users Fred, Mary and Abdul are not able to see the view object 206 until the occurrence of the enablement date. The additional logic section 414 may also specify a date that the view object 206 becomes inaccessible.

The view permissions group 416 includes permissions that apply to all of the content objects identified by the view object 206. The view permissions group 416 enables a user creating the view object 206 to quickly and efficiently set permissions for all of the content objects 502. However, as will be further discussed in connection with FIG. 6, the permissions of the view permissions group 416 do not supersede the intrinsic and share permissions of the content objects 502.

Figure 6:
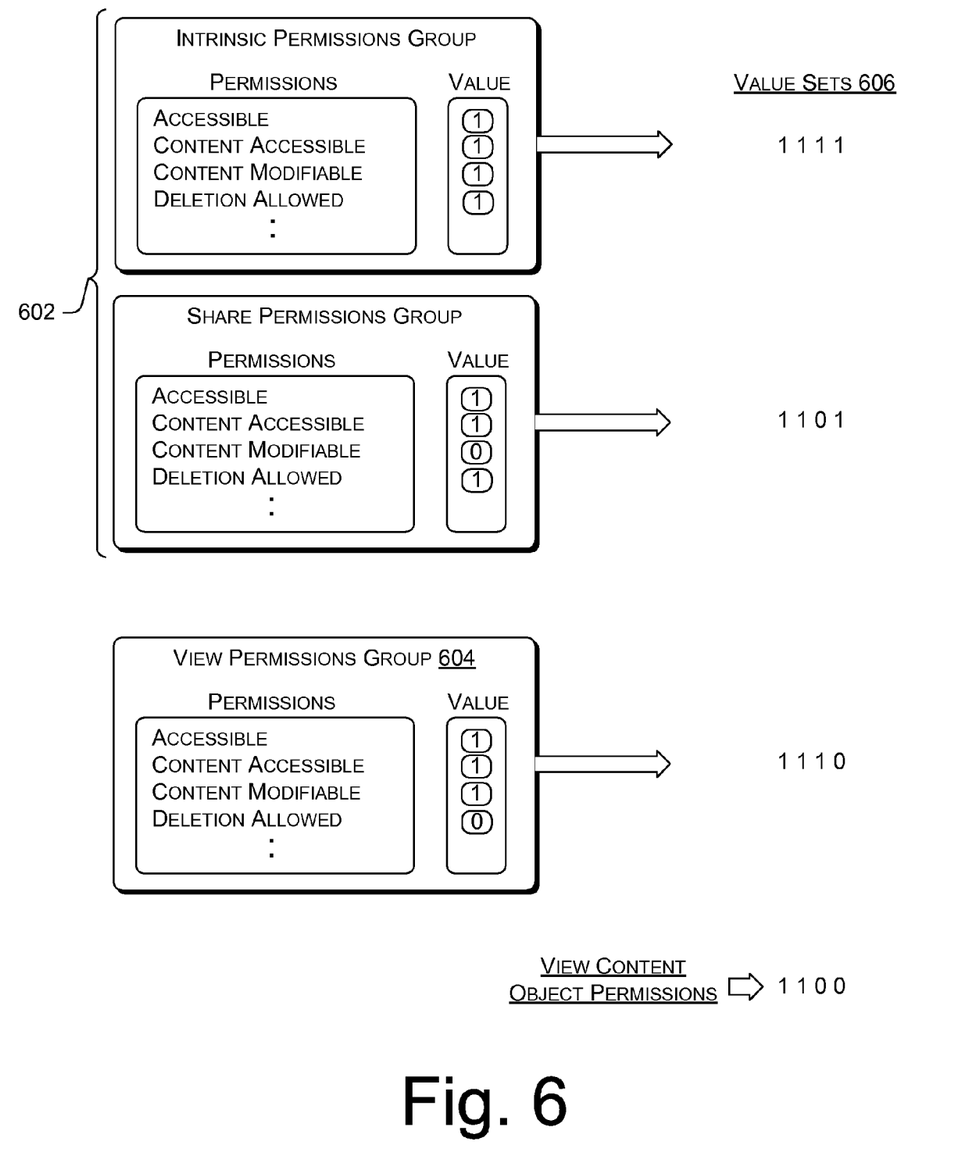
FIG. 6 is an exemplary illustration that shows the affect of a view permissions group on a content object's permissions. The content object is associated with a view object.

FIG. 6 is an exemplary illustration that shows the affect of a view permissions group, such as the view permissions group 416, on a content object's permissions. In the figure, two permission groups 602 are linked to a content object identified by a view object. The view object has a view permissions group 604 that defines permissions for all of its associated content objects. In order to simplify the discussion, four permissions are shown in each of the permission groups. It should be understood that any number of permissions may be included in the groups' permission sections.

A value sets column 606 is shown in FIG. 6. The value sets column 606 sets forth the values associated with each of the permissions groups shown in the figure. The intrinsic permission group has a value set $\{1, 1, 1, 1\}$. Therefore, all of the permissions of the intrinsic permissions group are enabled. The share permissions group has a value set $\{1, 1, 0, 1\}$. Therefore, all of the permissions, except the Content Modifiable permission, are enabled. Finally, the view permissions group 604 has a value set $\{1, 1, 1, 0\}$. Therefore, the Accessible, Content Accessible, and Content Modifiable permissions are enabled and the Deletion Allowed permission is disabled.

Basic set theory may be used to determine a content object's permissions. Assume that the content object having the two permissions groups 602 is not linked to a view object. An owner's use of the content object is not restricted at all by the permissions of the intrinsic permissions group. This is shown by the value set $\{1, 1, 1, 1\}$. If the owner wishes to share the content object with another user, the user gaining shared use of the content object is restricted by the intersection of the permissions defined by the intrinsic and share permissions groups. In this case, the intersection is $\{1, 1, 1, 1\} \cap \{1, 1, 0, 1\}$, which equals the permissions set $\{1,1,0,1\}$. Therefore, a user having shared access to the content object can do everything an owner can, except modify content of the content object.

Now, suppose an owner/creator adds the content object to a view object and the view object is setup to have the permissions as defined by the view permissions group 604. Again, basic set theory may be used to determine the content object's permissions. Taking the intersection of the values shown in FIG. 6, $\{1, 1, 1, 1\} \cap \{1, 1, 0, 1\} \cap \{1, 1, 1, 0\}$ yields the permission value set $\{1, 1, 0, 0\}$. Therefore, this content object seen through the view object has the permissions defined by the set $\{1, 1, 0, 0\}$. For another content object in the view object 206, one could perform a similar intersection of values associated with the permissions groups, that is values associated with the new content object's intrinsic and share permissions groups and the view's permissions group, to determine the permissions for this other content object when seen through the view object 206.

Exemplary Computing Device

Figure 7:
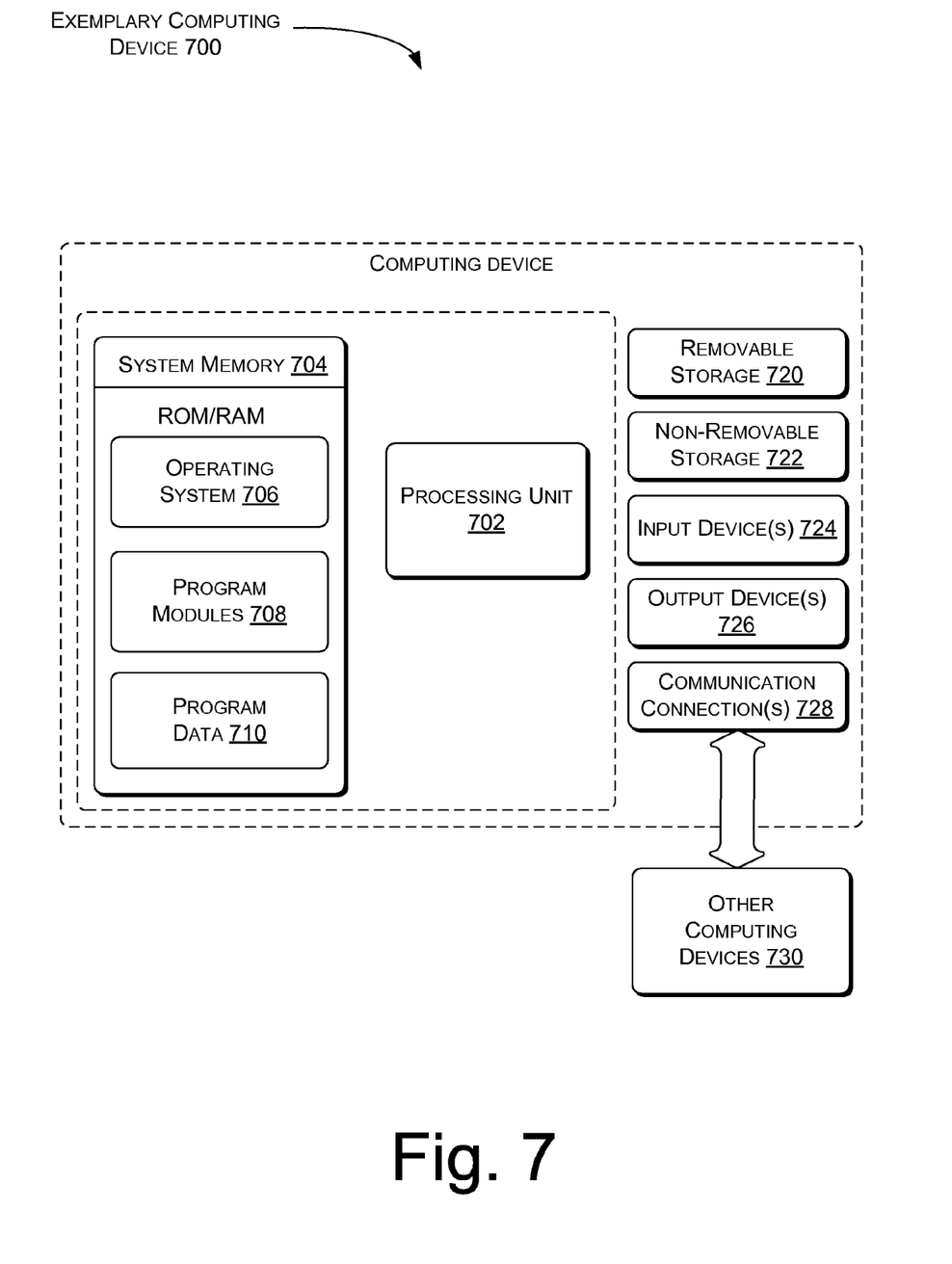
FIG. 7 is a block diagram illustrating functional components in a computing device that might be used to implement the clients or servers in FIG. 1.

FIG. 7 is an illustrative computing device that may be used to implement the client computers 102(1)-102(J), servers 108(1)-108(M) and 118(1)-118(P). In a very basic configuration, the computing device 700 includes at least one processing unit 702 and system memory 704. Depending on the exact configuration and type of computing device 700, the system memory 704 may be volatile (such as RAM), non-volatile (such as ROM, flash memory, etc.) or some combination of the two. The system memory 704 typically includes an operating system 706, one or more program modules 708, and may include program data 710. The implementations described herein may be realized by the program modules 708, the operating system 706, or the implementations may be installed on the computing device and stored in other memory (e.g., non-removable storage 722) separate from the system memory 704.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 720 and non-removable storage 722. Computer storage media may include volatile and non-volatile, removable and non-removable media implemented in any method or technology for storage of information, such as computer readable instructions, data structures, program modules, or other data. The system memory 704, removable storage 720 and non-removable storage 722 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of the device 700. Computing device 700 may also have input device(s) 724 such as keyboard, mouse, pen, voice input device, touch input device, etc. Output device(s) 726 such as a display, speakers, printer, etc. may also be included. These devices are well know in the art and need not be discussed at length.

The computing device 700 may also contain a communication connection 728 that allows the device to communicate with other computing devices 730, such as over a network like the network 106 of FIG. 1. Communication connection(s) 728 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Exemplary Interface

Figure 8:
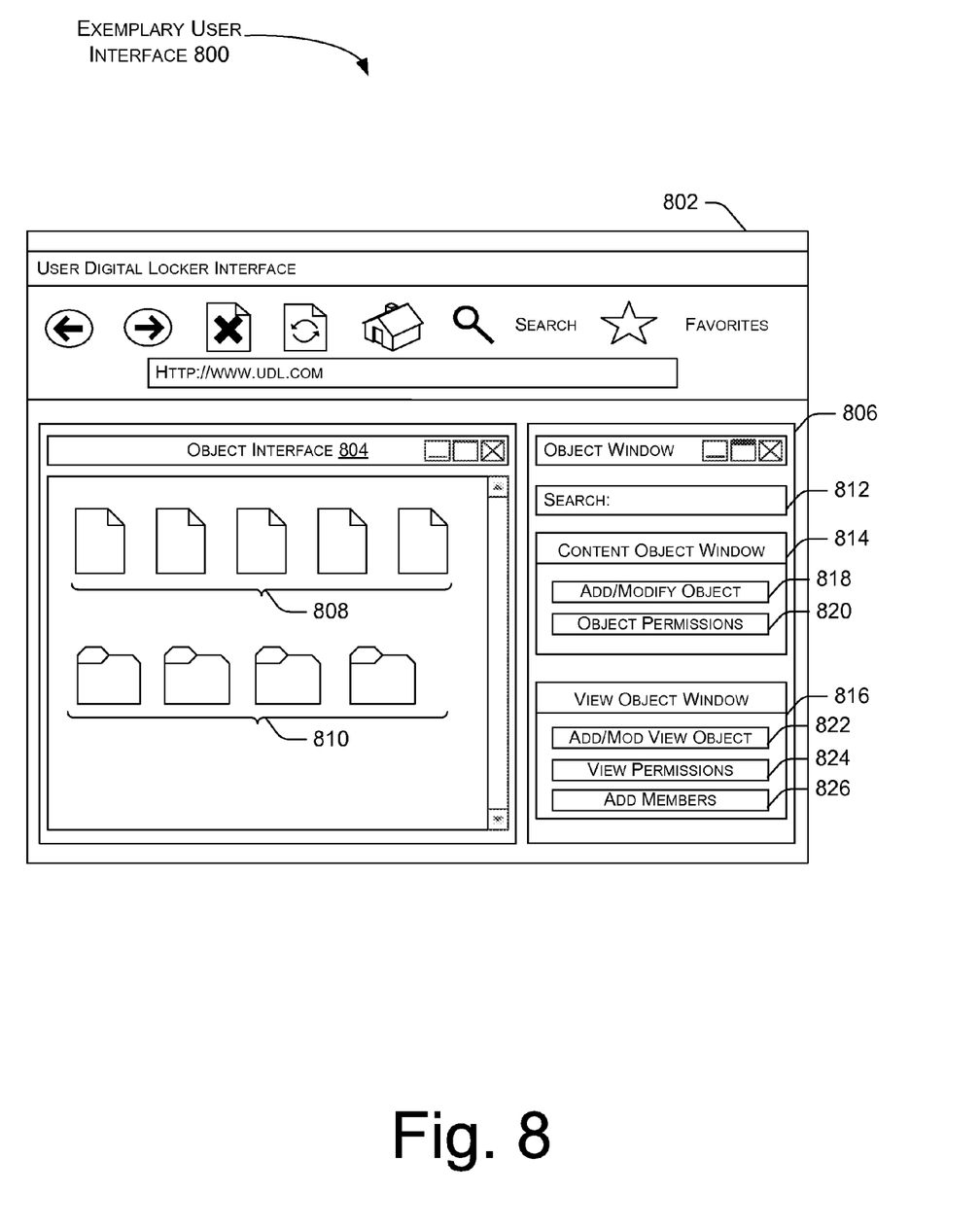
FIG. 8 illustrates an exemplary user interface that is displayable on a display device interfaced with a client computer. The exemplary user interface may be served by a server device implemented by a Website.

FIG. 8 illustrates an exemplary user interface 800 that is displayable on a display device interfaced with a client computer (e.g., a client device 102). Such a display device may be an appropriate computer display (e.g., an LCD or CRT display), a television, or the like. The user interface may be realized by computer-executable instructions stored in a memory of the Website's 104 server(s) 108 and executed by one or more processors of the servers 108. A realized user interface may be communicated to client computers 102 over the network 106 in the form of Webpages or other graphic formatted files. Alternatively, such computer-executable instructions may be stored in a storage unit or other memory of the client computer 102. The stored computer-executable instructions may be executed by a processor of the client computer 102 and displayed on an appropriate display device interfaced with the client computer 102. Computer-executable instructions for realizing the user interface illustrated in FIG. 8 may be downloaded from the servers 108. Application program interfaces (APIs) may also be retrieved from the servers 108 that enable developers to create a user interface that interfaces with content and view objects stored in the server 112. Such a user interface might bypass the Website 104 and the severs 108.

The exemplary user interface 800 illustrated in FIG. 8 is shown in a Web browser window 802. The user interface 800 includes an object interface section 804 and an object window section 806. The object interface section 804 may be used to display content objects 808 and view objects 810. A user interfacing with the user interface 800 may own some or all of the objects 808 and 810 and/or some or all of the objects 808 and 810 may be shared objects from another user. The objects 808 and 810 may be selected and the linked data used, displayed, replayed, etc. in a similar manner as one would select an icon or folder displayed on a computer screen.

The object window section 806 may be used to search for indexed content objects. A search field 812 is offered for that purpose. Terms and phrases entered into the search field 812 are compared against an index of searchable metadata linked to a plurality of content objects. Another interface window may be used to show the results of such a search.

The object window section 806 also includes a content object window 814 and a view object window 816. The content object window 814 includes an add object button 818 and an object permissions button 820. A user of the interface 802 may use the add/modify object button 818 to create a new content object. The process of creating a new content object may necessitate the identification of data associated with the new content object and uploading of the data to a data repository linked to the Website 104. Such a data repository is illustrated in FIG. 1 (i.e., the data repository 120).

The object permissions button 820 is used to define/modify content object permissions. A creator of a content object may modify all of the permissions associated with a content object. In particular, the intrinsic, share and copy permissions. An owner of a content object may or may not be able to modify all of the permissions associated with a content object. If the owner of a content object is the creator of the content object as well, then the owner can modify all of the permissions associated with the content object. However, in most cases, changing a content object's intrinsic permissions is limited to the creator of the object.

The view object window 816 includes three user selectable buttons. The buttons include an add view object button 822, a view permissions button 824 and an add members button 826. A user of the user interface 802 may use the add view object button 822 to add or modify a view object. Actuation of the button 822 creates an empty view object that may be added to the object interface section 804. The button 822 may also enable a user to add various content objects to the view and/or setup a query rule that specifies content objects that are included in the view object. The view permission button 824 is used to establish a view object's enabling permissions. The add members button 826 enables a user to added members/users that have access to the new view object. The add members button 826 may also be used to modify the users having access to an already existing view object.

Operation

Figure 9:
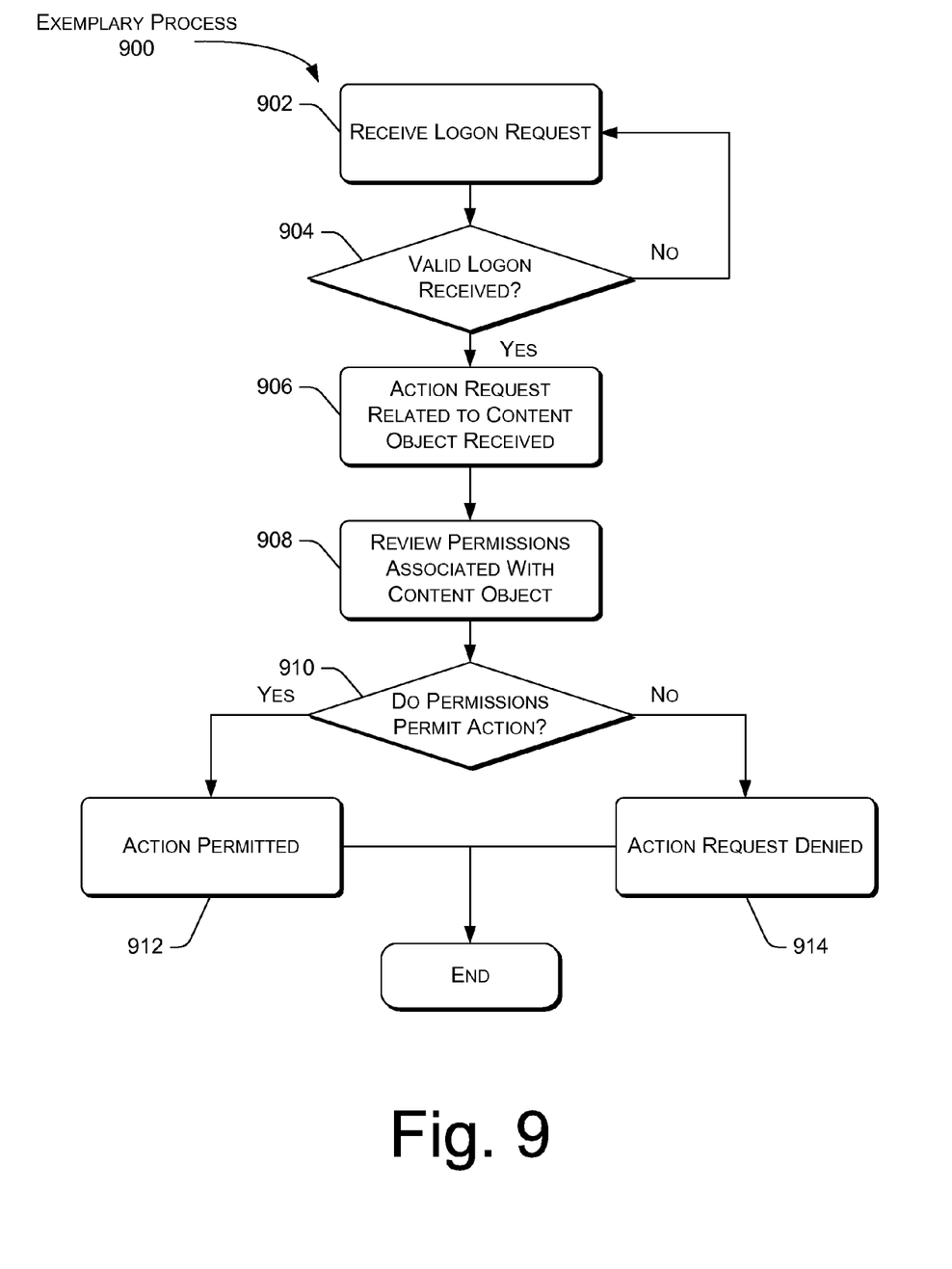
FIG. 9 is a flow diagram of a process for determining if a requested action associated with a content object is permitable.
Figure 10:
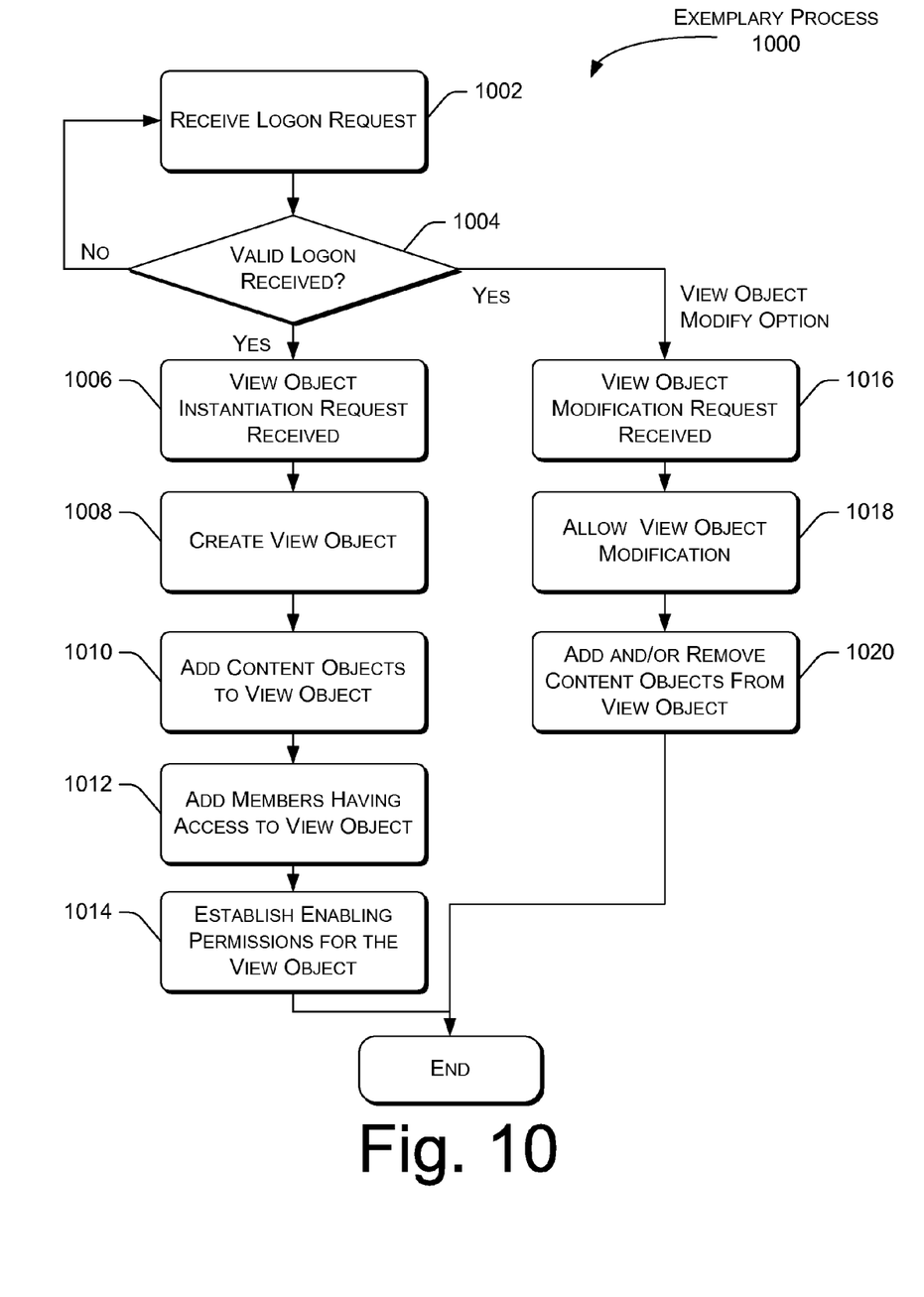
FIG. 10 is a flow diagram of a process for creating or modifying a view object. The view object may contain a number of content objects shared amongst a plurality of users.

FIGS. 9-10 illustrate example processes related to the use of content objects and view objects. Each process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to the environment 100 of FIG. 1, and the various design particulars of content and view objects. Content and view objects are discussed in detail with reference to FIGS. 1-8. Many acts described below may be implemented and performed by the environment 100 illustrated in FIG. 1. Users referred to in the following, as well as the foregoing, are generally interfacing with a client computer, or similar computing device, of the type described herein with reference to FIGS. 1 and 7.

FIG. 9 illustrates a general process 900 that an online data sharing entity, such as the Website 104, conducts when a user makes an action request related to a content object. An action request may be any one of many different actions that a user may want to do with or to a content object. Example actions related to content objects include copy requests, delete requests, metadata modification requests, permission change requests, etc.

At block 902, the Website, or other online data storage sharing entity, receives a user logon request. At block 904, the Website determines if the user logon request is valid. If not, the user will have to repeat the logon process. Any conventional user logon mechanism may be used by the Website to validate a user's request to gain access to the Website and the online data referenced therein.

At block 906, an action request related to a content object is received. Here, a user, using a user interface, may attempt to copy, delete, or otherwise modify a content object. At block 908, the Website reviews the content object's permissions to determine if the requested action is authorized. A creator of the content object should be able to do anything with a content object. However, a user in possession of a copy of a content object may be limited by copy permissions specified in a copy permissions group associated with the content object. In another example, a user may be interfacing with a communal version of a content object. The Website would evaluate permissions specified in a shared permissions group to determine what the user may do with the shared version of the content object. In yet another example, a content object may be associated with a view object. The Website would evaluate the view object's enabling permissions to determine what the user may do with the content object shared by way of the view object.

At block 910, the Website evaluates if the permissions of the content object or view object permit the action request of block 906. If so, at block 912, the Website allows the action request. Otherwise, at block 914, the Website denies the action request.

FIG. 10 illustrates a general process 100 that an online data sharing entity, such as the Website 104, conducts when a user makes a request to create a view object. FIG. 10 also illustrates a process that the Website 104 conducts when a user modifies a view object.

At block 1002, the Website, or other online data storage sharing entity, receives a user logon request. At block 1004, the Website determines if the user logon request is valid. If not, the user will have to repeat the logon process. Any conventional user logon mechanism may be used by the Website to validate a user's request to gain access to the Website and the online data referenced therein.

After successful logon to the Website, the user may desire to create a view object, or modify an existing view object. Creating a view object is described first, followed by a discussion of modifying an existing view object. A user may create and modify view objects using a user interface. Example user interfaces are illustrated in FIGS. 1 and 8.

At block 1006, the Website detects a user's request to create a new view object. Such a request may be made using the add view object button 822 included in the user interface 800. In response to the request to create a new view object, the Website creates a view object that is capable of holding a number of content objects. Exemplary view objects are shown in the object interface section 804.

At block 1010, the Website adds one or more content objects to the created view object. A user orchestrates which content objects are added to the created view object. In one implementation, the user simply specifies the content object names that are for inclusion in the view object. In another implementation, the user creates a query rule that is used to identify content objects for inclusion in the view object. At block 1012, members/users that will have access to the view object are associated with the view object. Again, a user determines the member/users that will have access to the view object. Members/users may be specified by username, email address, or another member/user credential used by the Website hosting the online data storage sharing arrangement. At block 1014, the Website establishes the view object's enabling permissions.

The acts performed at blocks 1010-1014 are in response to user directives received by the Website through a user interface. An example user interface that enables creation of view objects, adding users/members to view objects and specifying view objects' enabling permissions is illustrated in FIGS. 1 and 8.

Acts related to modifying an existing view object are described in connection with blocks 1016-1020. At block 1016, the Website receives a user request to modify an existing view object. The Website determines if the view object belongs to the requesting user. That is, a view object generally has to be modified by its creator. If so, at block 1018, the Website allows the requesting user to modify the existing view object. Here, the user may wish to add and/or remove content object from the existing view object. To add one or more content objects, the user may explicitly identify content objects or identify the objects by way of query. The user may also wish to add and/or remove members/users that have access to the existing view object. At block 1020, the Website adds and/or removes content objects from the view object.

The acts performed at blocks 1016-1020 are in response to user directives received by the Website through a user interface. An example user interface that enables creation of view objects, adding users/members to view objects and specifying view objects' enabling permissions is illustrated in FIGS. 1 and 8.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A server arrangement providing online storage of objects linked with data to form an online shared data environment, the arrangement comprising: one or more processors; a memory, accessible by the one or more processors; at least one content object stored in the memory, the at least one content object having a plurality of permissions groups having defined permissions that manage use of the at least one content object in the online shared data environment, wherein one of the plurality of permissions groups is an intrinsic permissions group that includes permissions specified upon introduction by an originator of the at least one content object into the online shared data environment and the intrinsic permissions group is unmodifiable after introduction as long as the at least one content object remains in the online shared data environment; and the at least one content object being linked to one or more data objects that are independent of the at least one content object.

2. A server arrangement as recited in claim 1, wherein the data objects are stored in a data repository that is separate from the memory the at least one content object is stored in.

3. A server arrangement as recited in claim 1, wherein the at least one content object includes a metadata section and a permissions section.

4. A server arrangement as recited in claim 1, wherein the at least one content object includes a metadata section, the metadata section includes data describing attributes associated with the at least one content object.

5. A server arrangement as recited in claim 1, wherein the at least one content object includes a metadata section, the metadata section includes data describing attributes associated with the at least one content object, one of the data being data that indicates when the at least one content object is no longer accessible.

6. A server arrangement as recited in claim 1, wherein the at least one content object includes a metadata section, the metadata section includes data describing attributes associated with the at least one content object, one of the data being data that indicates when the at least one content object becomes accessible.

7. A server arrangement as recited in claim 1, wherein the at least one content object includes a metadata section, the metadata section includes data describing attributes associated with the at least one content object, one of the data being a location or locations of the data objects the at least one content object is linked to.

8. A server arrangement as recited in claim 7, wherein the data specifying a location of at least one of the data objects is a filename for a data object and a path specifying a location of the data object associated with the filename.

9. A server arrangement as recited in claim 1, wherein one of the plurality of permissions groups is a copy permissions group that includes permissions that manage use of a copied version of the at least one content object.

10. A server arrangement as recited in claim 1, wherein one of the plurality of permissions groups is a share permissions group that includes permissions that manage use of the at least one content object when it shared with a user that is other than an owner of the at least one content object.

11. A server arrangement as recited in claim 1, further comprising a user digital locker stored in the memory, the user digital locker containing the at least one content object and being exclusively linked to a user's account that permits authorized access to the server arrangement.

12. A server arrangement providing online storage of objects linked with data objects, the arrangement comprising:
    one or more processors;
    a memory, accessible by the one or more processors;
    at least one content object stored in the memory, the at least one content object having a plurality of permissions groups having defined permissions that manage use of the at least one content object in the online shared data environment, wherein one of the plurality of permissions groups is an intrinsic permissions group that includes permissions specified upon introduction of the at least one content object into the online shared data environment and the intrinsic permissions are unmodifiable after introduction; and
    at least one view object stored in the memory and associated with at least one content object, the at least one view object shared amongst a plurality of users that are identified by the at least one view object.

13. A server arrangement as recited in claim 12, wherein the at least one view object includes a section that identifies users that have access to the at least one view object.

14. A server arrangement as recited in claim 12, wherein the at least one view object includes a section that identifies the at least one associated content object.

15. A server arrangement as recited in claim 14, the section identifies a plurality of content objects that are associated with the at least one view object.

16. A server arrangement as recited in claim 12, wherein the at least one view object includes a section that identifies when the at least one view object becomes accessible.

17. A server arrangement as recited in claim 12, wherein the at least one view object includes a section that identifies when the at least one view object is no longer accessible.

18. A server arrangement as recited in claim 12, wherein the at least one view object includes a section that defines a query rule used to dynamically identify content objects for inclusion in the at least one view object.

19. A server arrangement as recited in claim 12, wherein the at least one view object includes a view permissions group having defined permissions that manage use of at least one associated content object.

20. A server arrangement as recited in claim 12, wherein the at least one view object includes a view permissions group having defined permissions that manage use of all content objects associated with the at least one view object.

21. A method for sharing data in an online shared data environment, the sharing of data being facilitated through a Website in communication with a data repository, the method comprising:
    linking at least one digital locker with a user having access to the Website; and
    adding at least one content object to a view object that is sharable amongst a plurality of users having authorized access to the Website, the at least one content object and the view object stored in the at least one digital locker, wherein the at least one content object has a plurality of permissions groups having defined permissions that manage use of the at least one content object in the online shared data environment, wherein one of the plurality of permissions groups is an intrinsic permissions group that includes permissions specified upon introduction of the at least one content object into the online shared data environment and the intrinsic permissions are unmodifiable after introduction.

22. A method as recited in claim 21, wherein the at least one content object is linked to at least two data objects stored in the data repository.

23. A method as recited in claim 21, wherein the adding includes listing the at least one content object in a content object list section of the view object.

24. A method as recited in claim 21, further comprising specifying when the view object becomes shareable amongst the plurality of users.

25. A method as recited in claim 21, further comprising associating at least one user with the view object, the associated at least one user having access to the view object and the at least one content object referenced thereby.

26. A method as recited in claim 21, further comprising allowing the user to create content objects having linked data stored in the data repository.

27. A user interface linked to a user digital locker, the interface comprising:
    an object interface window section to display content objects and view objects; and
    an object window section to allow an originating user to add and modify content objects displayable in the object interface window section, and to allow a user to add and modify view objects displayable in the object interface window section, wherein adding content objects comprises incorporating content into the digital locker and specifying intrinsic permissions which are thereafter unmodifiable.

28. A user interface as recited in claim 27, wherein the user interface is a Webpage served by a Website hosting a plurality of user digital lockers.

29. A user interface as recited in claim 28, wherein content objects displayed in the object interface window section are linked to data objects stored in a data repository.

30. A user interface as recited in claim 28, wherein one or more Application program interfaces (APIs) link the user interface to the user digital locker.

* * * * *